United States Patent

Malki

[11] Patent Number: 5,855,300
[45] Date of Patent: Jan. 5, 1999

[54] DEVICE FOR DISPENSING A PREDETERMINED AMOUNT OF SOLIDS

[76] Inventor: Avraham Malki, 4692 Holly Park Place, Delta, British Columbia, Canada, V4K 4T8

[21] Appl. No.: 771,696

[22] Filed: Dec. 23, 1996

Related U.S. Application Data

[63] Continuation-in-part of Ser. No. 518,834, Aug. 24, 1995, abandoned.

[51] Int. Cl.[6] ....................................................... B67D 5/32
[52] U.S. Cl. .............................. 222/153.09; 222/185.1; 222/287; 222/308; 222/438; 222/449; 222/565
[58] Field of Search ............................. 222/153.09, 154, 222/158, 185.1, 189.02, 287, 308, 438, 448, 449, 565

[56] References Cited

U.S. PATENT DOCUMENTS

| 559,386 | 5/1896 | Jones . | |
|---|---|---|---|
| 1,601,862 | 10/1926 | Legg et al. | 222/308 |
| 2,081,544 | 5/1937 | Krivig | 221/104 |
| 2,561,696 | 7/1951 | Hammer | 222/448 |
| 2,873,050 | 2/1959 | Halverson | 222/158 |
| 3,252,632 | 5/1966 | Hagenes | 222/449 |
| 3,369,706 | 2/1968 | Schnyder | 2/82 |
| 4,109,835 | 8/1978 | Castro | 222/449 |
| 4,168,019 | 9/1979 | Hausam | 222/185 |
| 4,289,258 | 9/1981 | Ransom | 222/308 |
| 4,394,941 | 7/1983 | Recine | 222/355 |
| 4,463,876 | 8/1984 | Swallert | 222/94 |
| 5,341,961 | 8/1994 | Hausam | 22/217 |

FOREIGN PATENT DOCUMENTS

2204298  11/1988  United Kingdom ................... 222/154

Primary Examiner—Joseph A. Kaufman
Attorney, Agent, or Firm—Bull, Housser & Tupper

[57] ABSTRACT

A dispensing device for dispensing a predetermined amount of solid materials in powder or granular form allows a predetermined quantity, say for example a spoonful of sugar, to be dispensed into a coffee cup. The dispensing device allows measured quantities to be dispensed which avoids having to use a teaspoon or other measuring device. The device has a container, a body member below the container having a longitudinal passage therein, a top opening from the container to the longitudinal passage, a sliding member with a substantially rectangular cross-section, the sliding member having a sliding fit within the longitudinal passage, movable from a first position to a second position. A dispenser aperture extends through the sliding member and is positioned under the top opening from the container when the sliding member is in the first position, and a bottom opening in the body member from a bottom surface of the longitudinal passage to permit solids to dispense from the body member when the sliding member is in the second position, the bottom opening not overlapping the top opening.

15 Claims, 11 Drawing Sheets

DEVICE FOR DISPENSING A PREDETERMINED AMOUNT OF SOLIDS

CROSS REFERENCES TO RELATED APPLICATIONS

This is a Continuation in Part application of application Ser. No. 08/518,834 filed Aug. 24, 1995, now abandoned.

BACKGROUND OF THE INVENTION

The present invention relates to a dispensing device and more specifically to a dispensing device for dispensing a predetermined amount of solid materials in powder or granular form.

Dispensing devices positioned beneath hoppers, containers and the like are well known. In some cases these devices dispense solid materials in the form of powder or granular materials by pushing or pulling a lever such that a measured quantity of the material is dispensed. Examples of such dispensing devices are disclosed by Hammer in U.S. Pat. No. 2,561,696 and Jones in U.S. Pat. No. 559,386. Both of these patents disclose a dispensing aperture or chamber which is positioned first under an opening from a container, hopper or the like so material fills the chamber. The chamber is then moved over a discharge opening so that the material is dispensed.

Castro in U.S. Pat. No. 4,109,835 shows another embodiment of a dispensing device wherein a dispensing aperture or chamber is fixedly positioned with a top or filling aperture in a top sliding plate and a bottom or discharge aperture in a bottom sliding plate. The plates are moved together from a first position to a second position, in the first position the chamber fills and in the second position the chamber empties. The patents described herein are but a few of the known types of dispensers. Furthermore liquid dispensers for soap and the like having similar types of mechanisms are known.

It is an aim of the present invention to provide a portable dispensing device that can be used for dispensing food such as coffee, sugar, salt and the like and which can be hand held over for example a cup of coffee. By squeezing or depressing a handle or dispensing knob, a predetermined measure of sugar can be dispensed into the coffee. The device can preferably be used with one hand. Such a device avoids having to use a spoon to measure a specific quantity of sugar. In existing types of sugar jars it is difficult to control the exact quantity of sugar dispensed and the present measuring device provides a dispenser which always dispenses the same quantity of sugar or other particulate material every time the handle or knob is depressed.

The present invention provides a device for dispensing a predetermined amount of solids comprising a container, a body member below the container having a longitudinal passage therein, a top opening from the container to the longitudinal passage, a sliding member with a substantially rectangular cross-section, the sliding member having a sliding fit within the longitudinal passage movable from a first position to a second position, a dispenser aperture extending through the sliding member and positioned under the top opening from the container when the sliding member is in the first position, a bottom opening in the body member from a bottom surface of the longitudinal passage to permit solids to dispense from the body member when the sliding member is in the second position, the bottom opening not overlapping the top opening.

In another embodiment there is provided an adjustment mechanism for varying the volume of the dispenser aperture so that the amount of solids being dispensed can be varied.

In drawings which illustrate embodiments of the present invention.

SUMMARY OF PREFERRED EMBODIMENTS OF THE INVENTION

Figure 1:
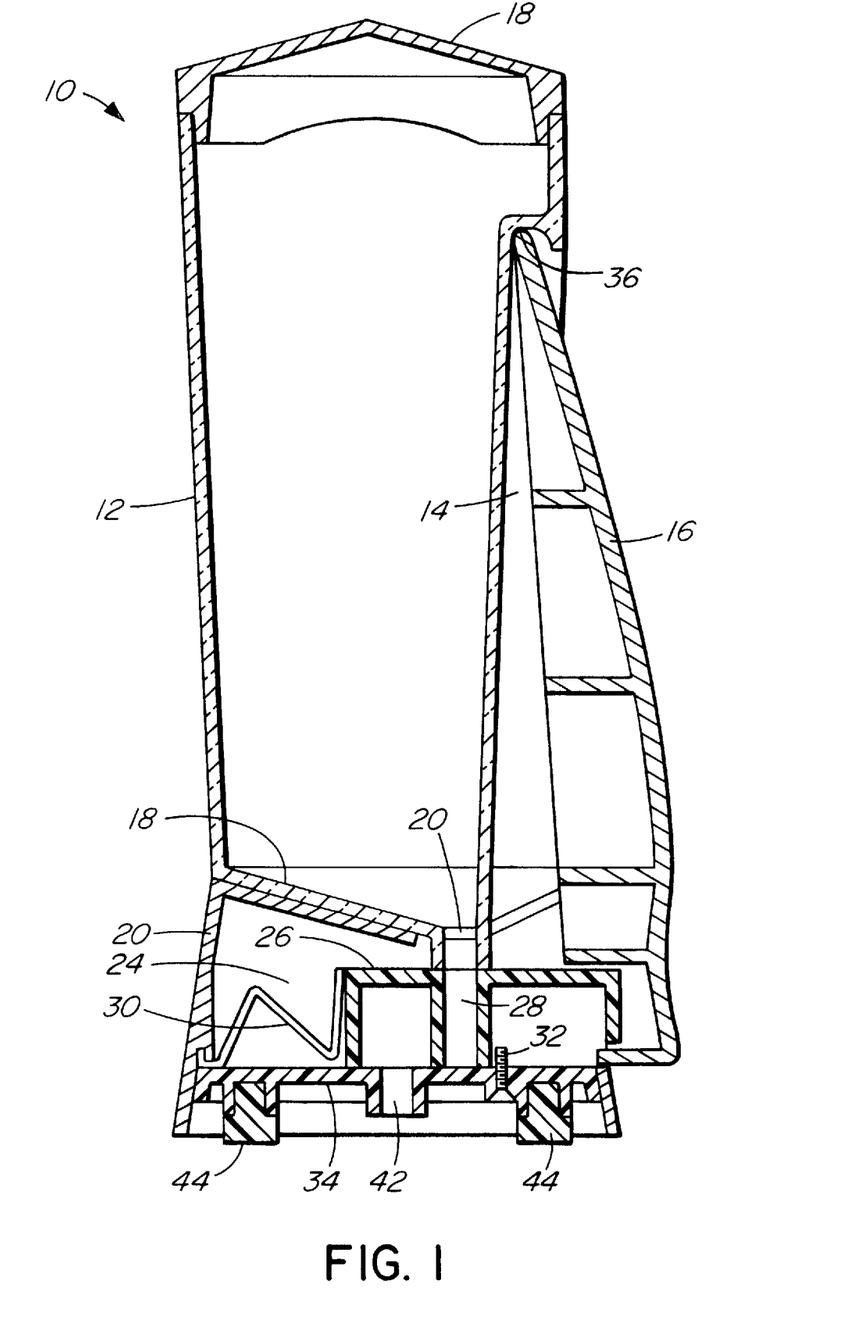
FIG. 1 is an elevational cross-sectional view showing one embodiment of a dispenser according to the present invention with the dispenser aperture in the fill position.
Figure 2:
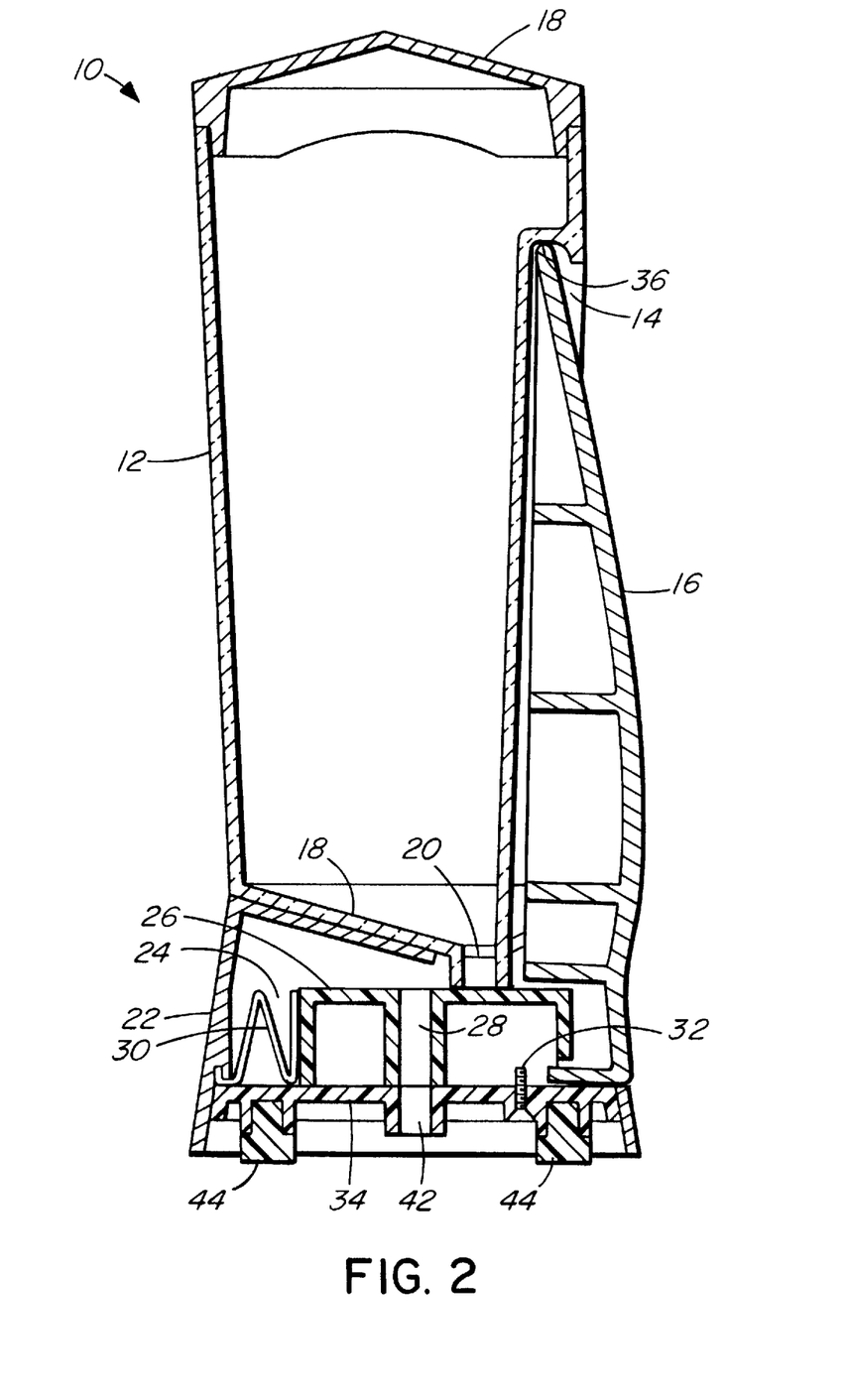
FIG. 2 is an elevational cross-sectional view of the dispenser shown in FIG. 1 with the dispenser aperture in the dispense position.
Figure 3:
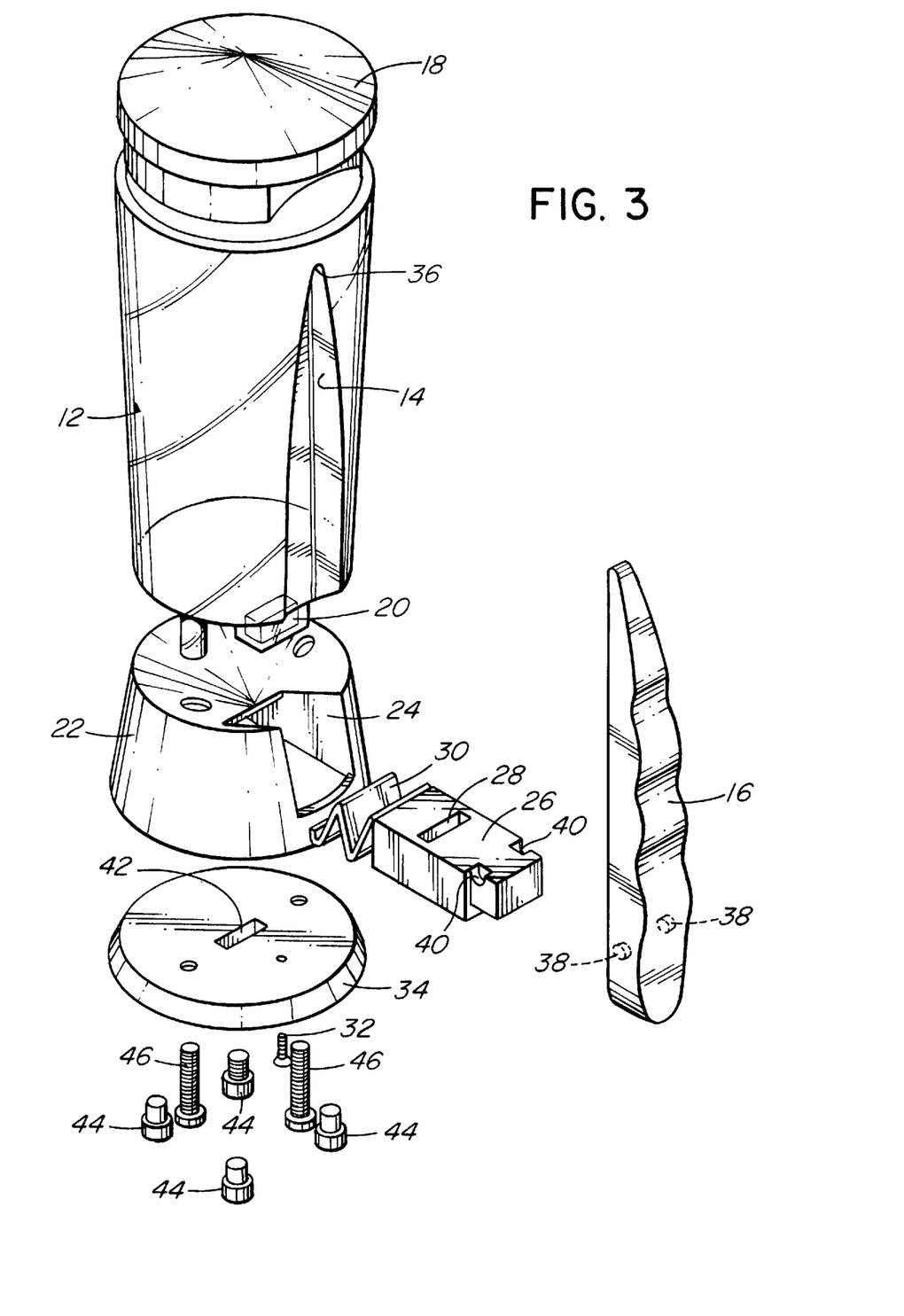
FIG. 3 is an isometric exploded view of the dispenser shown in FIGS. 1 and 2.

The dispenser 10 shown in FIGS. 1 to 3 has a clear plastic container 12 with slightly tapered sides and a side indent 14 for insertion of a squeeze handle 16. A lid 18 is provided at the top of the container 12. At the base of the container 12 a sloped bottom surface 19 extends to a top opening 20 which is positioned adjacent the indent 14. Beneath the container 12 is a body member 22 having transverse to the container 12 a longitudinal passage 24 in which slides a sliding member 26. The sliding member 26 has a sliding fit within the passage 24 and a dispenser aperture 28 extends vertically through the sliding member 26 having substantially the same cross-sectional area as the top opening 20 in the base of the container 12. The dispenser aperture 28 is positioned directly under the top opening 20 in the container 12 when the sliding member 26 is in the first position or fill position. A stainless steel spring 30 is positioned in the passage 24 at a closed end pushing against the sliding member 26. A retaining screw 32 is provided extending up from a bottom plate 34 of the body member 22 and acts as a stop to retain the sliding member in the first position or fill position, with the top opening 20 aligned with the dispenser aperture 28.

The squeeze handle 16 fits into the indent 14 and has a pivot point 36 at the top and two engagement protrusions 38 which engage in slots 40 in the top of the sliding member 26. When the squeeze handle 16 is squeezed, the sliding member 26 moves in the longitudinal passage 24 to a second position, or dispense position as shown in FIG. 2 wherein a bottom opening 42 in the bottom plate 34 is positioned directly underneath the dispenser aperture 28. Thus, solid materials in the dispenser aperture 28 are dispensed from the dispenser.

The bottom opening 42 is not aligned with the top opening 20 so that there is no flow through of solid ingredients from the container 12. As shown in FIGS. 1 and 2, the bottom opening 42 is approximately in the center of the container 12, thus the dispenser can be held over a cup of coffee or whatever is required to be filled, and ensure that ingredients will be dispensed from approximately the center of the dispenser.

Rubber feet 44 are shown fitting into appropriate sockets in the base 34 of the body member 22 so that the unit will stand on a smooth table or counter surfaces without sliding. As shown in FIG. 3, machine screws 46 are provided on two sides to hold the container 12 and body member 22 including the bottom plate 34 together.

In operation, the container 12 is held in one hand and the squeeze handle 16 squeezed. This action moves the sliding member 26 in the passageway 24 to the second or dispense position and sugar or other granular or powder ingredients in the dispenser aperture 28 are dispensed through the bottom opening 42 in the bottom plate 34. When the gripping handle 16 is released, the spring 30 pushes the sliding member 26 back to the first or fill position, and ingredients in the container 12 fill up the dispenser aperture 28 ready for the next dispensing application. In one embodiment the size of the dispenser aperture 28 represents half a teaspoon and thus one requires four squeezes of the squeeze handle 16 to obtain two teaspoons of, for example, sugar from the dispenser 10.

Figure 4:
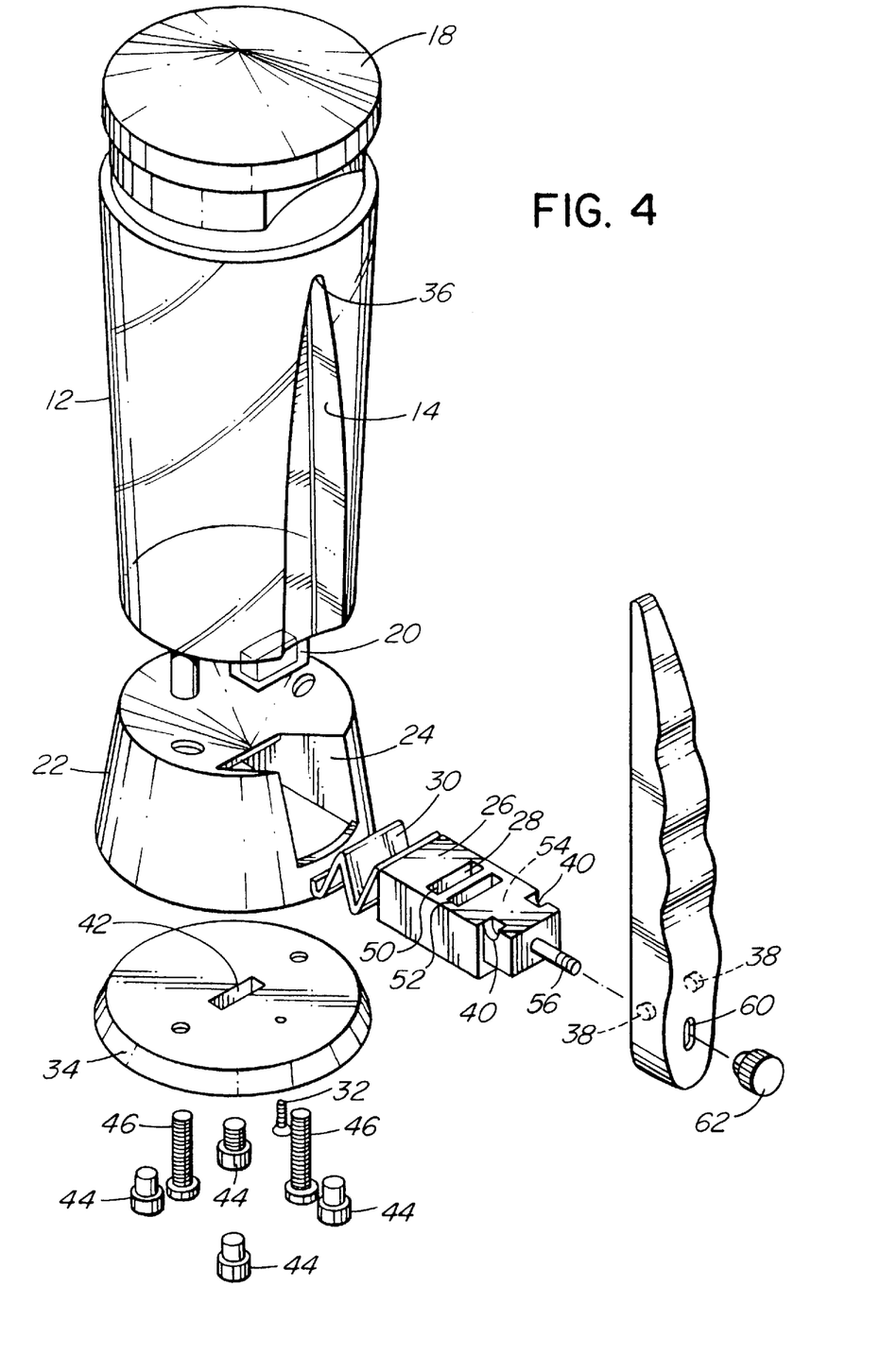
FIG. 4 is an isometric exploded view showing another embodiment of a dispenser according to the present invention having a dispenser aperture of which the volume may be varied.

Another embodiment is illustrated in FIG. 4 wherein the dispenser aperture 28 has a slide plate member 50 therein which moves in a larger aperture 52 of the sliding member 26. A threaded hole 54 extends out through the end of the sliding member 26 and a threaded rod 56 fits therein having an end attachment (not shown) which engages the sliding plate member 50 within the aperture 52. The threaded rod 56 extends through a slot 60 at the bottom of the squeeze handle 16 and has a knob 62 at the end of the rod 56. Thus, rotation of the knob 62 moves the threaded rod 56 backwards and forwards in the threaded hole 54 which in turn moves the sliding plate member 50 backwards and forwards in the aperture 52.

This movement changes the size of the dispenser aperture 28. For example the dispenser aperture 28 may be changed from a half teaspoon to one teaspoon or any other desired size that is required. Provision is provided to prevent the sliding plate member 50 being pushed too far forward thus preventing ingredients from the top opening 20 falling behind the sliding plate member 50. Graduations (not shown) may be provided on the knob 62 or adjacent the knob 62 so that the volume of the dispenser aperture 28 is known.

In the embodiment shown, the dispenser 10 is grippable in one hand and operable by squeezing the squeeze handle 16. Other types of dispensers may be provided. For example, dispensers provided in kitchen cupboards or the like may be fixed in position or may be mounted along a kitchen wall. The squeeze handle 16 may then be replaced by a plunger which simply requires a push. This is particularly true when the dispenser is attached to a wall or a shelf.

A further embodiment of the present invention, shown in FIGS. 5A–10 inclusive, will now be discussed. The embodiment provides a mechanism facilitating removal of the squeeze handle and attached sliding member from the apparatus to facilitate cleaning of the sensor aperture, sliding member and the longitudinal passage.

Figure 5A:
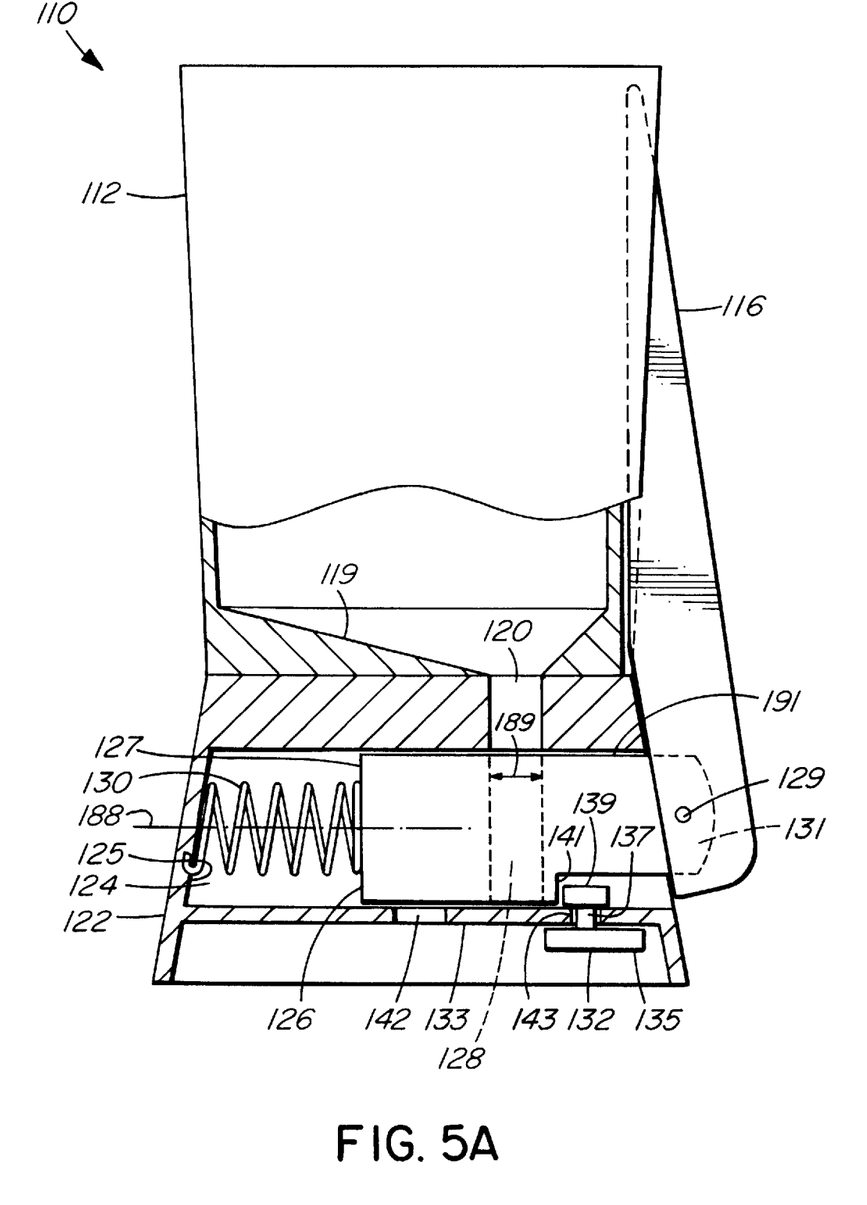
FIG. 5A is an elevation cross-sectional view of the dispenser of an alternate embodiment of the present invention.
Figure 5B:
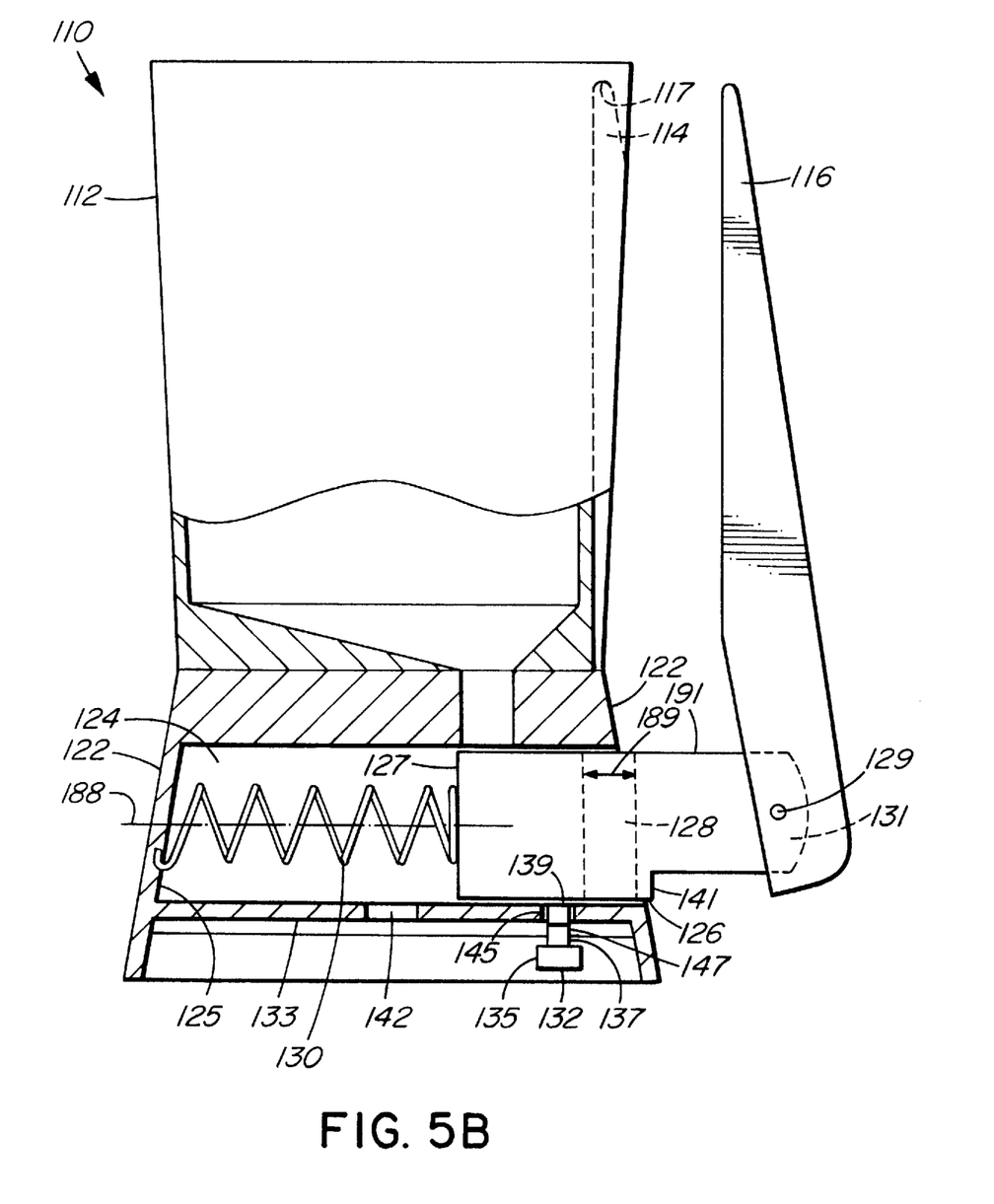
FIG. 5B is an elevational cross-sectional view of the dispenser of FIG. 5A with the handle and connected pourance in a partially disassembled position.

Referring initially to FIGS. 5A and 5B, apparatus 110 is shown with lid removed. Clear plastic container 112 is used to store dry ingredients, such as salt, pepper, sugar, and the like for dispensing in pre-determined measured amounts. Side indent 114 (FIG. 5B) is formed in a side of container 112 to permit insertion of a portion of squeeze handle 116. This permits pivoting of squeeze handle 116 about apex 117 of indent 114 as squeeze handle 116 is squeezed between its rest position (shown in FIG. 5A) and its depressed position (shown in FIGS. 2 with respect to the first embodiment) and FIG. 8 (with respect to the subject embodiment).

The base of container 112 includes an integral sloped bottom surface (shown in dotted outline) 119 which extends to a top opening 120 offset from the longitudinal axis of apparatus 110 in the direction of indent 114.

Body member 122 extends below container 112 and is attached thereto. Body member 122 contains an internal longitudinal passage 124 transverse to the longitudinal axis of container 112. Sliding member 126 is dimension for sliding movement along the longitudinal axis of passage 124. Outer end 131 of member 126 is pivotally connected to handle 116 by pivot pin 129.

Figure 9:
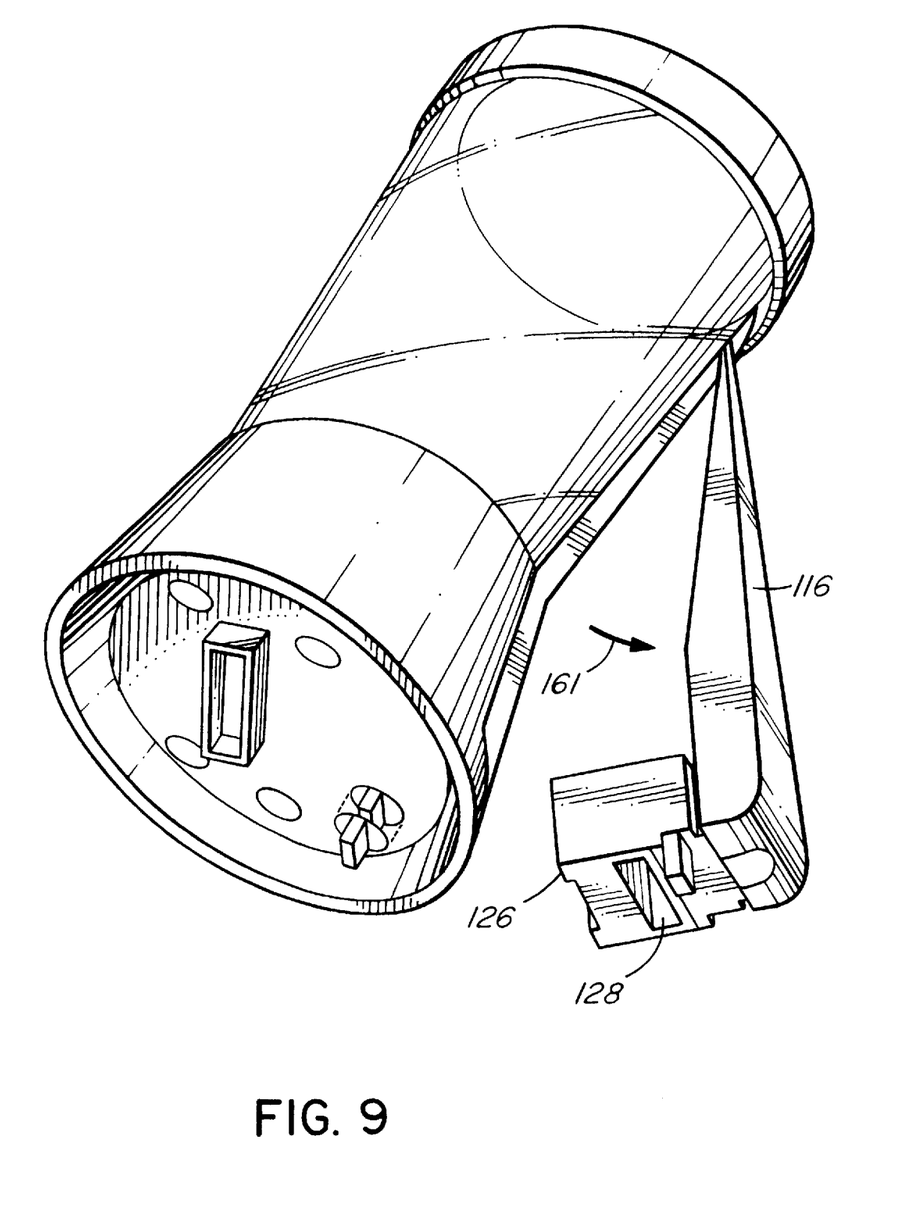
FIG. 9 is a perspective view of the dispenser of FIG. 5A showing the handle in its removed position from the dispenser and the retaining pin in its disengaged position.

Dispenser aperture 128 extends through a portion of member 126. As also seen in FIG. 9, aperture 128 is open at its bottom end (shown) and at its top end (not shown). Aperture 128 is dimensioned such that it contains, when full, a precise predetermined measure of dry ingredients received from container 112. For example, if it is desired that one-half teaspoon be dispensed each time squeeze handle 116 is depressed, then aperture 128 is dimensioned to contain one half teaspoon of material. Top opening 120 has substantially the same cross-sectional area as aperture 128. As depicted in FIG. 5A, when handle 116 is in its rest position, opening 120 is in alignment with the top of aperture 128. This permits material contained in container 112 to flow by gravitational force down opening 120 to fill aperture 128 to provide a predetermined measured amount (for example half a teaspoon) of material in aperture 128.

A deformable stainless steel spring 130 is positioned in passage 24 between end face 125 of passageway 124 and inner end face 127 of member 126. Spring 130 is biased to urge member 126 outwardly along passage 124 in the direction of handle 116.

Retaining pin 132 is releasably connected to bottom member 133 of body member 122. Pin 132 includes outer flange member 135, intermediate member 137 and stop member 139. Pin 132 is movable between an upper engaged position, shown in FIG. 5A and a lower disengaged position shown in FIG. 5B. When pin 132 is in its engaged position, stop member 139 is positioned to interfere with edge 141 to stop outer movement of member 126 resisting outward biasing pressure of spring 130. When pin 132 is in its disengaged position, stop member 139 does not interfere with edge 141 and member 126 is free to move in an outward direction past stop member 139 due to biasing pressure of spring 130. Handle 116 and member 126 may then be readily removed from container 112 and body member 122 for cleaning of passage 124, aperture 128 and other internal components of apparatus 110. This permits removal of material should it become lodged within opening 120, aperture 128 and/or passage 124 to ensure proper operation of apparatus 110. This includes cleaning to ensure proper slidable movement of member 126 within passage 124 and accurate dispensing of material through aperture 128.

Bottom member 133 includes opening 142 extending through member 133 into passage 124 in the region at or near the longitudinal axis of apparatus 110 and in a position inward of the axis of opening 120. Top opening 120 and bottom opening 133 are offset from each other along the longitudinal axis 188 of passage 124 a distance greater than the width 189 of aperture 128.

Stop member 139 is generally T-shaped in cross section. Opening 143 through which member 137 extends is longitudinal in shape. When retaining pin 132 is in its engaged position, as depicted in FIG. 5A, the T-shaped stop member 139 engages adjacent inner sides of opening 143. Pin 132 is then securely attached to end member 133 in friction fit engagement. Flange member 135 may be rotated by the user to align T-shaped stop member 139 with longitudinal opening 143 to enable pin 132 to be pulled or to fall into upper portion 145 of opening 143. Lower portion 145 of opening 143 is of smaller diameter than upper portion 147 which prevents pin 132 from being completely removed from apparatus 110. At the same time stop member 139 is seated completely within lower portion 145 in the disengaged position of pin 132, enabling sliding member 126 to move past stop member 139 in an outward direction permitting removal of handle 116 and member 126 from apparatus 110.

As discussed above, when handle 116 is in the rest position with edge 141 engaged by stop member 139 (as depicted in FIG. 5A), opening 120 is aligned with aperture 128. Handle 116 is movable from the rest position as depicted in FIG. 5A inwardly to the depressed, dispensing position which is depicted in FIG. 2 with respect to the first embodiment. Spring 130 is compressed as squeeze handle 116 is moved to the depressed position. When in the fully depressed position, aperture 128 aligns with opening 142 which permits the measured amount of material in aperture 128 to be dispensed from apparatus 110 in the predetermined measured amount based on the volume of aperture 128.

As can be seen from FIGS. 5A, bottom member 133 provides a lower wall in substantially sealing engagement with aperture 128 preventing leakage of material between bottom member 133 and the bottom side of member 126. Likewise, when handle 116 is moved towards the depressed position, upper side 191 of member 126 is moved across the bottom of opening 120 to sealingly engage opening 120 to provide a lower seal preventing leakage of material from opening 120 and container 112. Openings 120 and 142 are positioned such that opening 120 is fully sealed by upper side 191 of member 126 before aperture 128 begins to engage opening 142. In this way the user is prevented from positioning handle 116 and sliding member 126 in a manner in which opening 120 and opening 142 are connected with aperture 128 at the same time. This prevents continuous pouring of material in container 112 out opening 142.

Figure 10A:
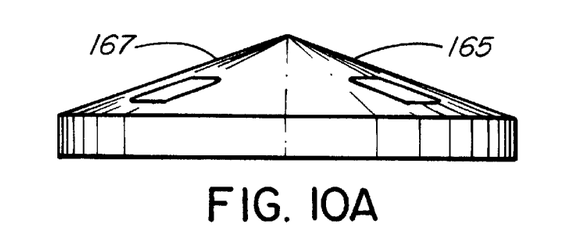
FIG. 10A is elevational side view of the lid of the dispenser.
Figures 10B, 10C:
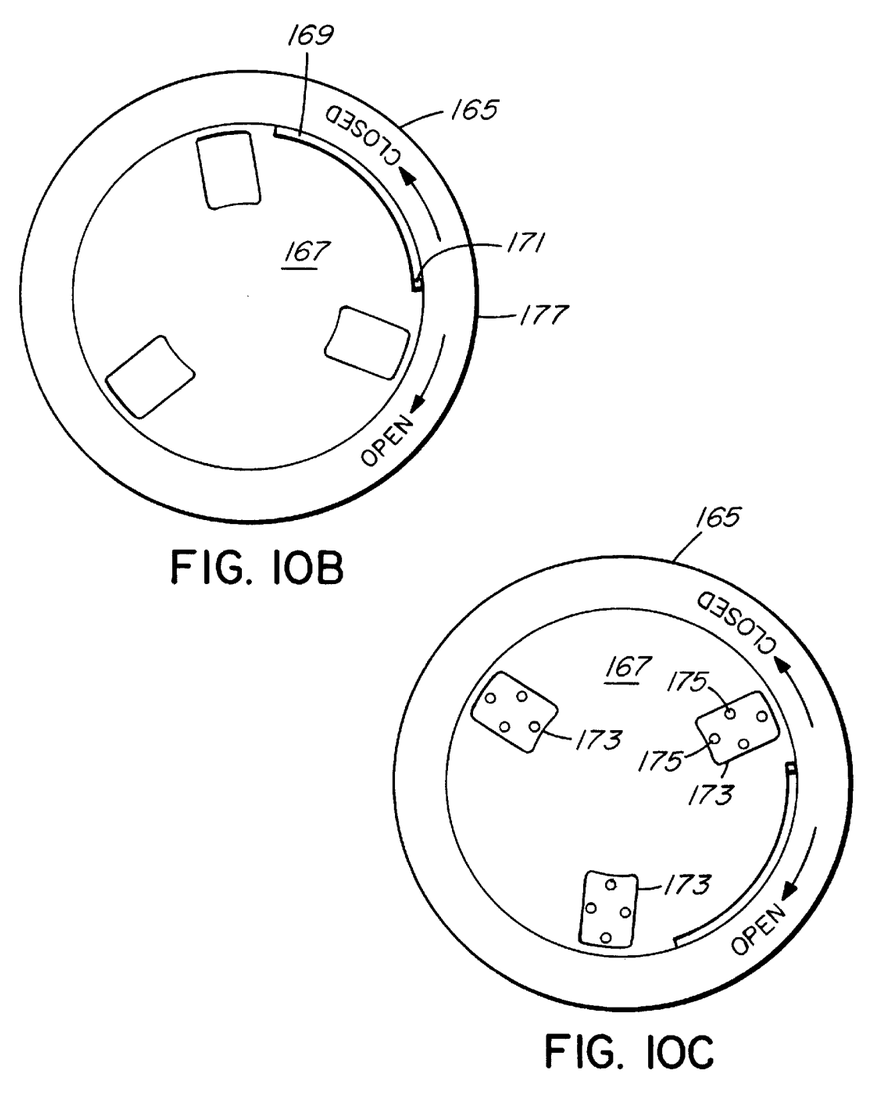
FIG. 10B is a top plan view of the lid of the dispenser with the lid cover in the closed position.
FIG. 10C is a top plan view of the lid shown in FIG. 10A with the lid cover in the open position.

Lid 165 will now be described with reference to FIGS. 10A, 10B and 10C. Lid 165 includes rotatable lid cover 167 which is rotated about the axis of lid 165 between a closed position, as depicted in FIG. 10B and an open position as depicted in FIG. 10C. Channel member 169 is formed along a portion of the outer circumference of lid cover 167. Pin member 171 is formed in lid base member 177 to fit in channel member 169. As can be seen from FIGS. 10B and 10C, pin member 171 acts as a stop member preventing further rotational movement of lid cover 167 beyond a rotational arc defined by channel member 169. This permits lid cover 167 to be moved to the open position aligning openings 173 of lid cover 167 with holes 175 of lid base member 177. The contents of container 112 may then be dispensed from the top of container 112 through lid 165 by shaking action.

When lid cover 167 is moved to the closed position, depicted in FIG. 10B, openings 173 are positioned over an area of lid base member 177 which has no openings into container 112, thereby preventing material in container 112 from being dispensed outwardly through lid 165.

Operation

In operation container 112 is filled with material such as sugar, salt, pepper, spices or other dry materials desired to be dispensed by the user in the predetermined amounts based on the size of aperture 128 in that particular apparatus 110. Lid 165 is then screwed onto the top of container 112. If the user wishes to shake out small portions of the contents of container 112, he can move the lid cover from the closed position (FIG. 10B) to the open position (FIG. 10C) and shake out a suitable amount of material in container 112.

If the user wishes to dispense the predetermined amount of material (for example half a teaspoon), the user can depress squeeze handle 116 while apparatus 110 is over the container into which the material is intended to be deposited. The premeasured amount of material in aperture 128 is then moved inwardly towards the longitudinal axis of apparatus 110 as sliding member 126 is moved inwardly by handle 116. In the fully depressed position, the contents of aperture 128 are dispensed out opening 142 into the appropriate container selected by the user. This allows the user to very simply and conveniently obtain precise measurement of ingredients and dispense that measured amount as desired.

Removal for Cleaning

The process for removing certain internal components of apparatus 110 will now be discussed with reference to FIGS. 6–9, inclusive.

Figure 6:
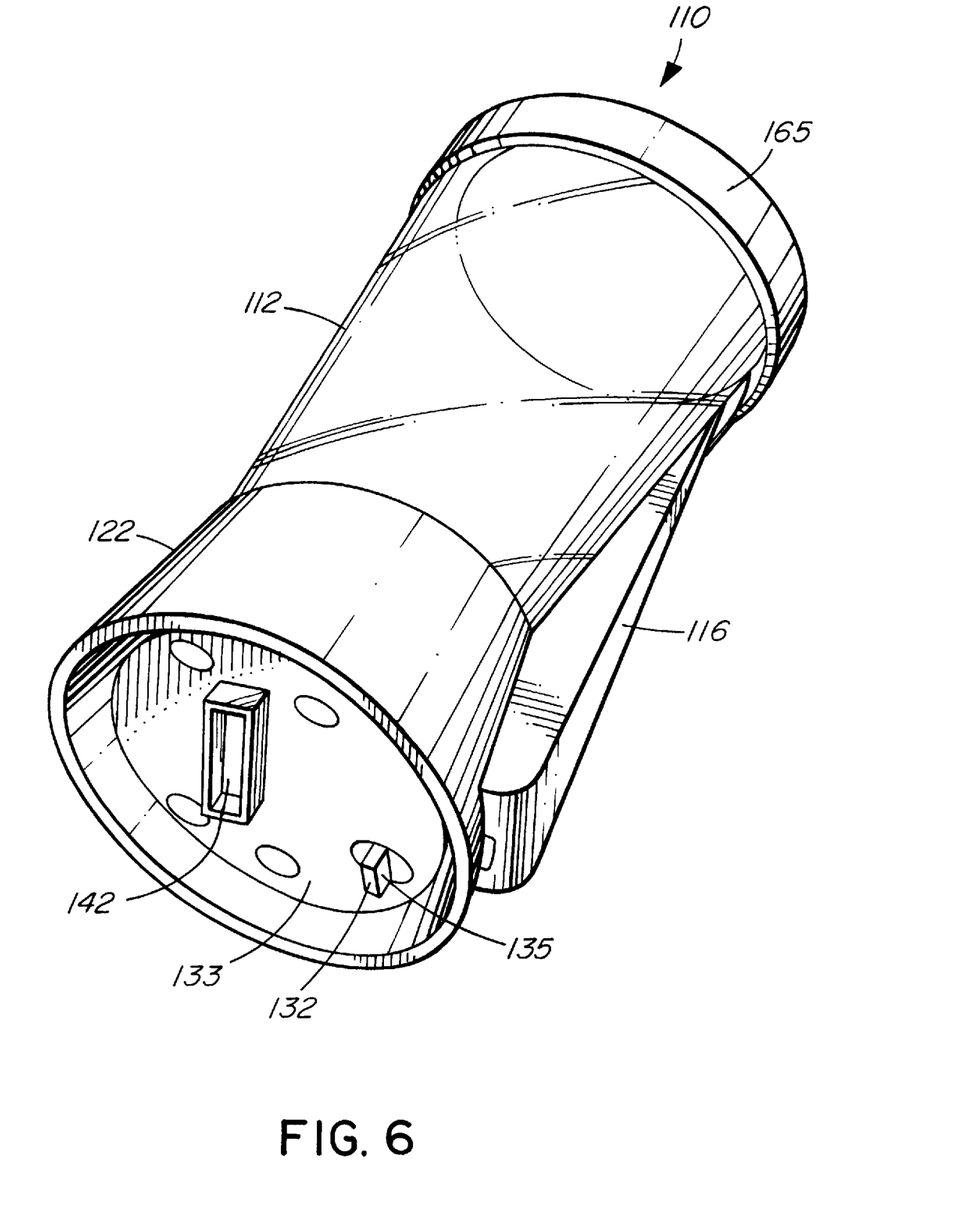
FIG. 6 is a perspective view of the dispenser of FIG. 5A with the handle in the locked position.

Referring to FIG. 6, apparatus 110 is shown with squeeze handle 116 in its rest position. Pin 132 is in its engaged position with stop member 139 engaging edge 141 preventing further outward movement of member 126. The rest position is the general orientation of apparatus 110 when not in use and when not being cleaned by the user.

Figure 7:
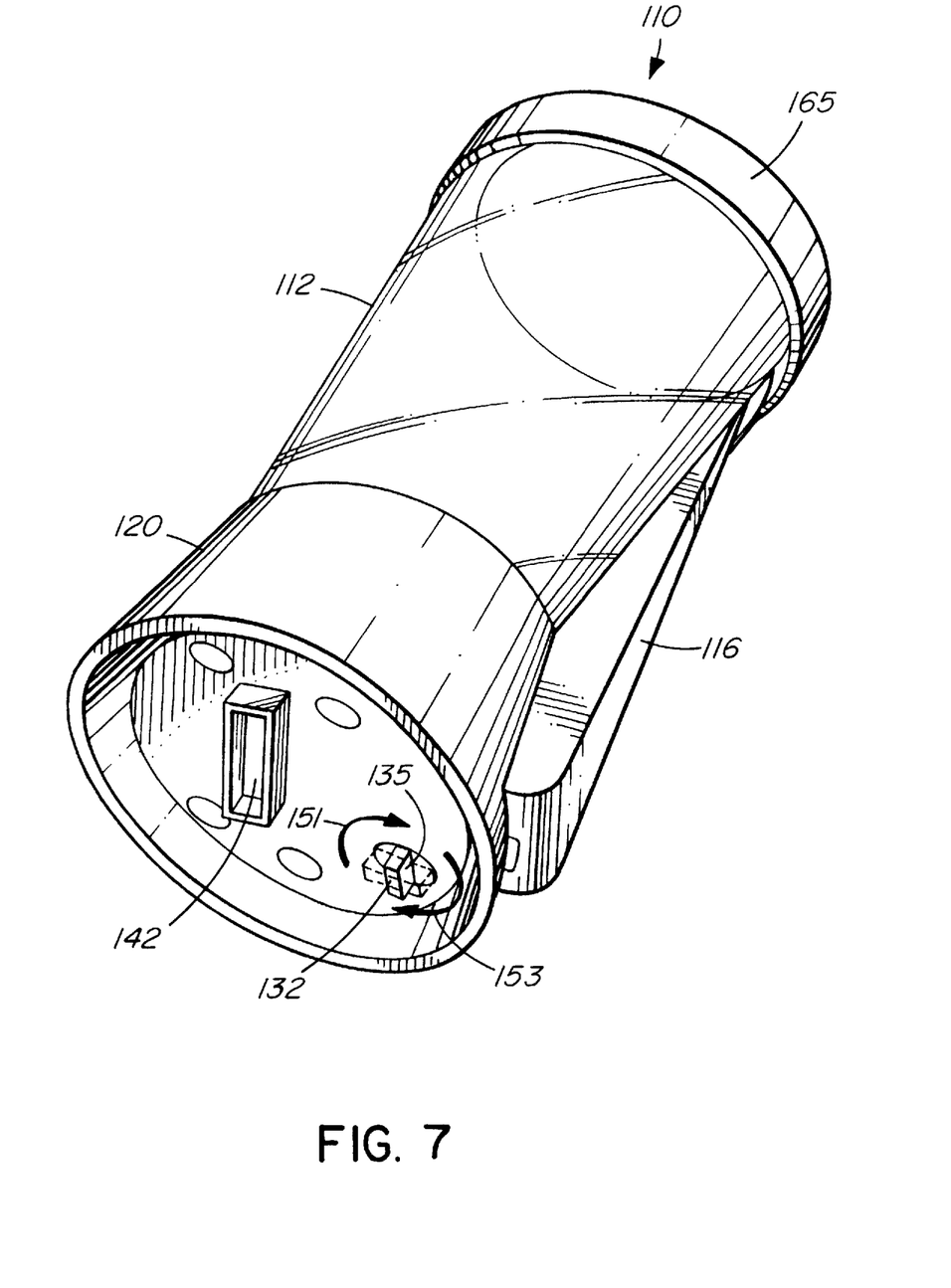
FIG. 7 is a perspective view of the dispenser shown in FIG. 5A showing movement between the locked and open positions.

Referring to FIG. 7, if the user desires to clean certain of the internal components of apparatus 110 pin 132 is rotated in a clockwise direction as depicted by arrows 151 and 153 until flange member 135 is in a position lateral to the engaged position (shown in dotted outline in FIG. 7). Pin 132 may then be moved into upper portion 145 (see FIG. 5B) thereby permitting edge 141 to move past stop member 139 with outward biasing pressure from spring 130. The user can facilitate the disengagement of stop member 139 from edge 141 by lightly depressing handle 116 in an inward direction as pin 132 is rotated in the clockwise direction discussed above. This relieves the biasing pressure of spring 130 from stop member 139.

Figure 8:
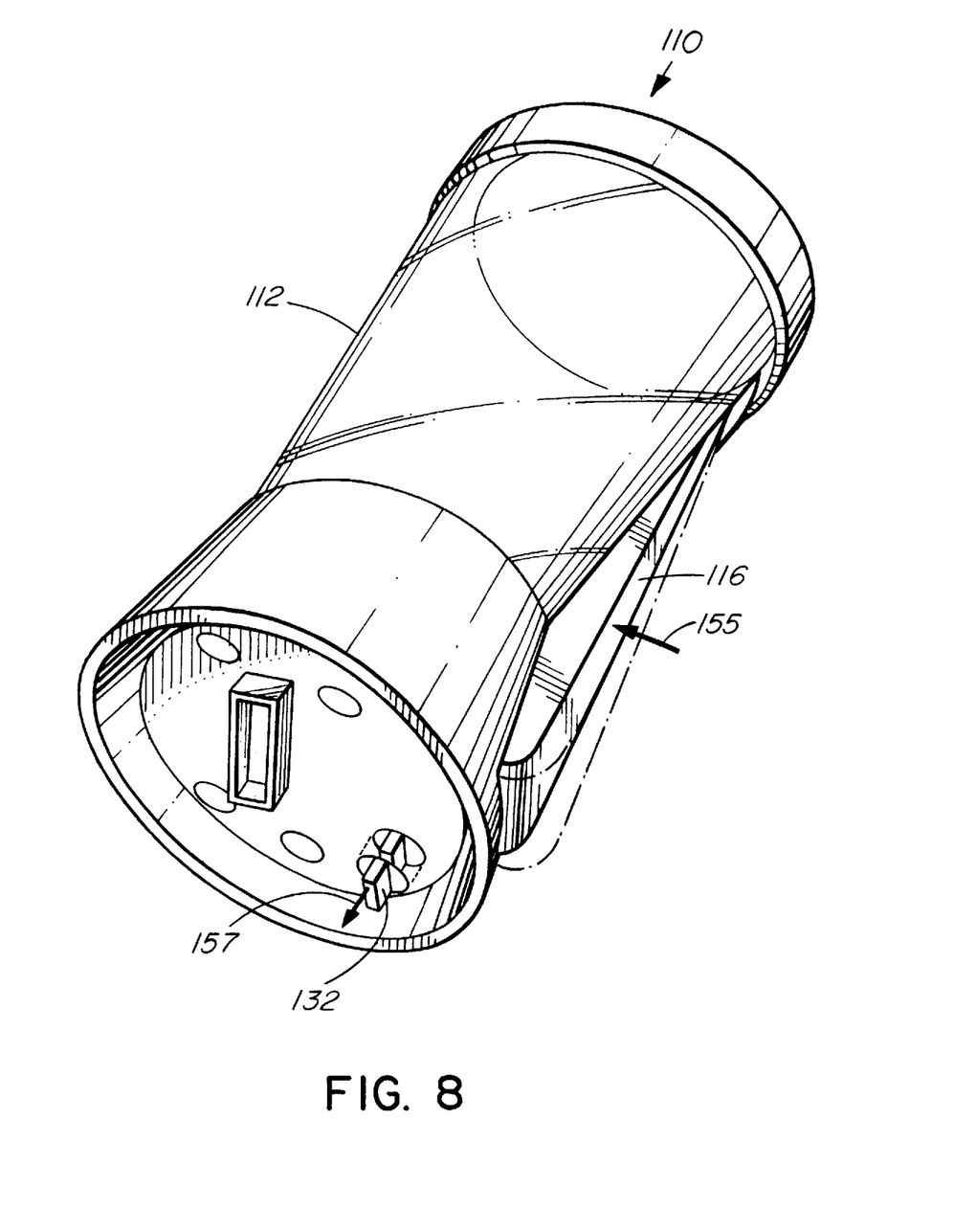
FIG. 8 is a perspective view of the dispenser of FIG. 5A showing the handle in the pressed position and movement of the retaining pin to the disengaged position.

Referring to FIG. 8, as handle 116 is depressed in the direction of arrow 155 pin 132 may be moved or dropped outwardly in the direction of arrow 157. The user can then release inward pressure on handle 116 allowing the biasing pressure of spring 130 to move the bottom portion of handle 116, and member 126 outwardly in the manner as depicted in FIG. 5B.

Referring to FIG. 9, handle 116 and member 126 are then removable by the user once spring 130 is fully expanded by moving handle 116 in an outward direction, that is in the direction of arrow 161. Handle 116 may then be removed from apex 117 and member 126 can then be fully removed from passage 124. Handle 116 and member 126 may then be cleaned and dried. It is particularly important to clean out any residual materials in aperture 128 which may readily be accomplished when member 126 is removed from passage 124. In addition, passage 124 is now accessible for cleaning as are openings 120 and 142.

In order to prevent accidental removal of spring 130 from passage 124, the outer end of spring 130 may be rigidly attached to the inner wall of body member 122. When member 126 is fully removed, spring 130 is retained in passage 124.

To reinsert handle and member 126 into apparatus 110 the process is reversed. The top part of handle 116 is positioned inside apex 117 and the bottom end of handle 116, with member 126 is positioned into passage 124. Handle 116 is then squeezed inwardly by the user engaging and compressing spring 130. This is continued until edge 141 is moved past stop member 139 enabling the user to push pin 132 upwardly and to rotate pin 132 in a counterclockwise direction to both engage edge 141 and to engage pin 132 in friction fit within opening 143. Apparatus 110 is now in its rest position, as depicted in FIG. 6. Container 112 can then be filled with material and lid 165 reattached to the top of the container. Apparatus 110 is then ready for use.

Various changes may be made to the embodiments shown herein without departing from the scope of the present invention which is limited only by the following claims.

I claim:

1. A device for dispensing a predetermined amount of solids comprising:
   (a) a container;
   (b) a body member below the container having a longitudinal passage therein;
   (c) a top opening from the container to the longitudinal passage;
   (d) a sliding member having a sliding fit within the longitudinal passage, movable between a first position to a second position, the sliding member comprising a upper side connected to and moving with the sliding member, the fit between the upper side and the passage being sufficiently tight to substantially seal the top opening preventing flow of solids from the container when the sliding member is in the second position,
   (e) a dispenser aperture extending through the sliding member and aligned with the top opening when the sliding member is in the first position, the dispenser aperture dimensioned equal to the predetermined amount,
   (f) a bottom opening in the body member aligned with the dispenser aperture when the sliding member is in the second position,
   (g) the top opening and bottom opening being offset from each other in the direction of the longitudinal axis of the passage a distance greater than the width of the aperture in the direction of the longitudinal axis of the passage so that upper side is in position to seal the top opening when the sliding member is in the second position to permit solids to dispense from the aperture through the bottom opening and to prevent solids from entering the aperture from the container when the sliding member is in the second position.

2. The device for dispensing a predetermined amount of solids according to claim 1 including a squeeze handle external of the container connected to one end of the sliding member and a spring means within the passage, the spring means maintaining the sliding member in the first position and the handle, when activated, moving the sliding member to the second position.

3. The device for dispensing a predetermined amount of solids according to claim 1 wherein the top opening is positioned at one side of the longitudinal passage and the bottom opening is positioned in the approximate center of the longitudinal passage.

4. The device for dispensing a predetermined amount of solids according to claim 1 wherein the container is made of transparent material.

5. The device for dispensing a predetermined amount of solids according to claim 2 wherein the handle is activated by squeezing using one hand.

6. The device for dispensing a predetermined amount of solids according to claim 1 wherein the dispenser aperture has a volume adjustment means therein.

7. The device for dispensing a predetermined amount of solids according to claim 6 wherein the volume adjustment means for the dispenser aperture comprises an adjustable plate having an adjustment screw operable from outside the device.

8. The device according to claim 1 further comprising biasing means within the passage for biasing the sliding member in a direction along the longitudinal passage toward the first position.

9. The device according to claim 8 further comprising a pin connected to the body member moveable between a first position in which the pin extends into the longitudinal passage to contact the sliding member and prevents movement of the sliding member beyond the first position and a second position in which the pin does not extend into the passage thereby permitting the sliding member to move beyond the sliding member second position and out of the passage.

10. The device according to claim 9 further comprising retaining means communicating with the pin to connect the pin to the body member while permitting the pin to move between the first and second pin positions.

11. The device according to claim 10 further comprising a squeeze handle external of the container connected to one end of the sliding member opposite the end contacting the biasing means to facilitate movement of the sliding member between the first and second sliding member positions and to enable removal of the sliding member from the passage when the pin is in its second position by manually pulling the squeeze handle outwardly from the body member.

12. The device according to claim 1 wherein the upper side is located adjacent the dispenser aperture and extends laterally therefrom to substantially seal the top opening preventing flow of solids from the container except when the sliding member is in the first position.

13. A device for dispensing a predetermined amount of solids comprising:
   (a) a container;
   (b) a body member below the container having a longitudinal passage therein;
   (c) a top opening from the container to the longitudinal passage;
   (d) a sliding member having a sliding fit within the longitudinal passage, movable between a first position to a second position the fit between the sliding member and the passage being sufficiently tight to substantially seal the top opening preventing flow of solids from the container when in use, unless the sliding member is in the first position;
   (e) a dispenser aperture extending through the sliding member and aligned with the top opening when the sliding member is in the first position;

(f) a bottom opening in the body member aligned with the dispenser aperture when the sliding member is in the second position;

(g) the top opening and bottom opening being offset from each other in the direction of the longitudinal axis of the passage a distance greater than the width of the aperture in the direction of the longitudinal axis of the passage to permit solids to dispense from the aperture through the bottom opening and to prevent solids from entering the aperture from the container when the sliding member is in the second position;

(i) biasing means within the passage for biasing the sliding member in a direction along the longitudinal passage toward the first position;

(j) and a pin connected to the body member moveable between a first position in which the pin extends into the longitudinal passage to contact the sliding member and prevent movement of the sliding member beyond the first position and a second position in which the pin does not extend into the passage thereby permitting the sliding member to move beyond the sliding member second position and out of the passage.

14. The device according to claim 13 further comprising retaining means communicating with the pin to connect the pin to the body member while permitting the pin to move between the first and second pin positions.

15. The device according to claim 13 further comprising a squeeze handle external of the container connected to one end of the sliding member opposite the end contacting the biasing means to facilitate movement of the sliding member between the first and second sliding positions and to enable removal of the sliding member from the passage when the pin is in its second position by manually pulling the squeeze handle outwardly from the body member.

* * * * *